(12) United States Patent
Toyota et al.

(10) Patent No.: US 12,283,987 B2
(45) Date of Patent: Apr. 22, 2025

(54) OPTICAL SCANNER

(71) Applicant: DENSO CORPORATION, Kariya (JP)

(72) Inventors: Yuichi Toyota, Kariya (JP); Taro Beppu, Kariya (JP); Chihiro Moriguchi, Kariya (JP); Hikaru Sasaki, Kariya (JP)

(73) Assignee: DENSO CORPORATION, Kariya (JP)

( * ) Notice: Subject to any disclaimer, the term of this patent is extended or adjusted under 35 U.S.C. 154(b) by 210 days.

(21) Appl. No.: 18/191,332

(22) Filed: Mar. 28, 2023

(65) Prior Publication Data

US 2023/0239047 A1 Jul. 27, 2023

Related U.S. Application Data

(63) Continuation of application No. PCT/JP2021/034112, filed on Sep. 16, 2021.

(30) Foreign Application Priority Data

Sep. 30, 2020 (JP) .................. 2020-165997

(51) Int. Cl.
*H04B 10/11* (2013.01)
*G01S 7/4911* (2020.01)

(52) U.S. Cl.
CPC ........... *H04B 10/11* (2013.01); *G01S 7/4911* (2013.01)

(58) Field of Classification Search
None
See application file for complete search history.

(56) References Cited

U.S. PATENT DOCUMENTS

| | | | | |
|---|---|---|---|---|
| 10,191,145 | B2 * | 1/2019 | Swanson | G02B 6/29302 |
| 10,901,293 | B1 * | 1/2021 | Guo | G01S 7/4817 |
| 11,061,140 | B2 * | 7/2021 | Hosseini | G01S 7/4813 |
| 11,573,294 | B2 * | 2/2023 | Sun | G01S 7/4817 |
| 11,971,589 | B2 * | 4/2024 | Grieco | H04B 10/11 |
| 2018/0039154 | A1 * | 2/2018 | Hashemi | G02F 1/2955 |
| 2018/0107091 | A1 * | 4/2018 | Hosseini | G02F 1/292 |
| 2018/0175501 | A1 * | 6/2018 | Byun | G02F 1/292 |
| 2020/0158839 | A1 * | 5/2020 | Lin | G01C 25/00 |
| 2021/0270943 | A1 * | 9/2021 | Hwang | G01S 17/42 |
| 2023/0140940 | A1 * | 5/2023 | Nicolaescu | G01S 7/4911 359/315 |
| 2023/0236472 | A1 * | 7/2023 | Moriguchi | G02F 1/295 359/298 |

* cited by examiner

*Primary Examiner* — Jai M Lee
(74) *Attorney, Agent, or Firm* — Maschoff Brennan

(57) ABSTRACT

An optical scanner includes a light source, an optical phased array, a monitoring light receiving unit, and a signal processing unit. The optical phased array implements scanning by a light beam by individually controlling phases of a plurality of branched lights into which light supplied from the light source is branched, using a scanning phase amount, and radiating light from an antenna array that has a plurality of antenna elements. The monitoring light receiving unit receives light radiated from the optical phased array. The signal processing unit detects characteristics of the light beam from a detection result of the monitoring light receiving unit and generate a phase adjustment amount for correcting the scanning phase amount such that a detection value of the characteristics coincides with a design value prepared in advance.

12 Claims, 12 Drawing Sheets

OPTICAL SCANNER

CROSS-REFERENCE TO RELATED APPLICATION

The present application is a continuation application of International Application No. PCT/JP2021/034112, filed on Sep. 16, 2021, which claims priority to Japanese Patent Application No. 2020-165997, filed on Sep. 30, 2020. The contents of these applications are incorporated herein by reference in their entirety.

BACKGROUND

Technical Field

The present disclosure relates to an optical scanner that uses an optical phased array.

Related Art

A technology in which beamforming and beam steering are performed through use of an optical phased array is known. In the optical phased array, an antenna array that has a plurality of antenna elements that radiate light is used, and respective phase shift amounts that are provided to the antenna elements are controlled.

SUMMARY

One aspect of the present disclosure provides an optical scanner that includes a light source, an optical phase array, a monitoring light receiving unit, and a signal processing unit. The optical phased array implements scanning by a light beam by individually controlling phases of a plurality of branched lights into which light supplied from the light source is branched, using a scanning phase amount, and radiating light from an antenna array that has a plurality of antenna elements. The monitoring light receiving unit receives light radiated from the optical phased array. The signal processing unit detects characteristics of the light beam from a detection result of the monitoring light receiving unit and generates a phase adjustment amount for correcting the scanning phase amount such that a detection value of the characteristics coincides with a design value prepared in advance.

DESCRIPTION OF THE EMBODIMENTS

Figure 1:
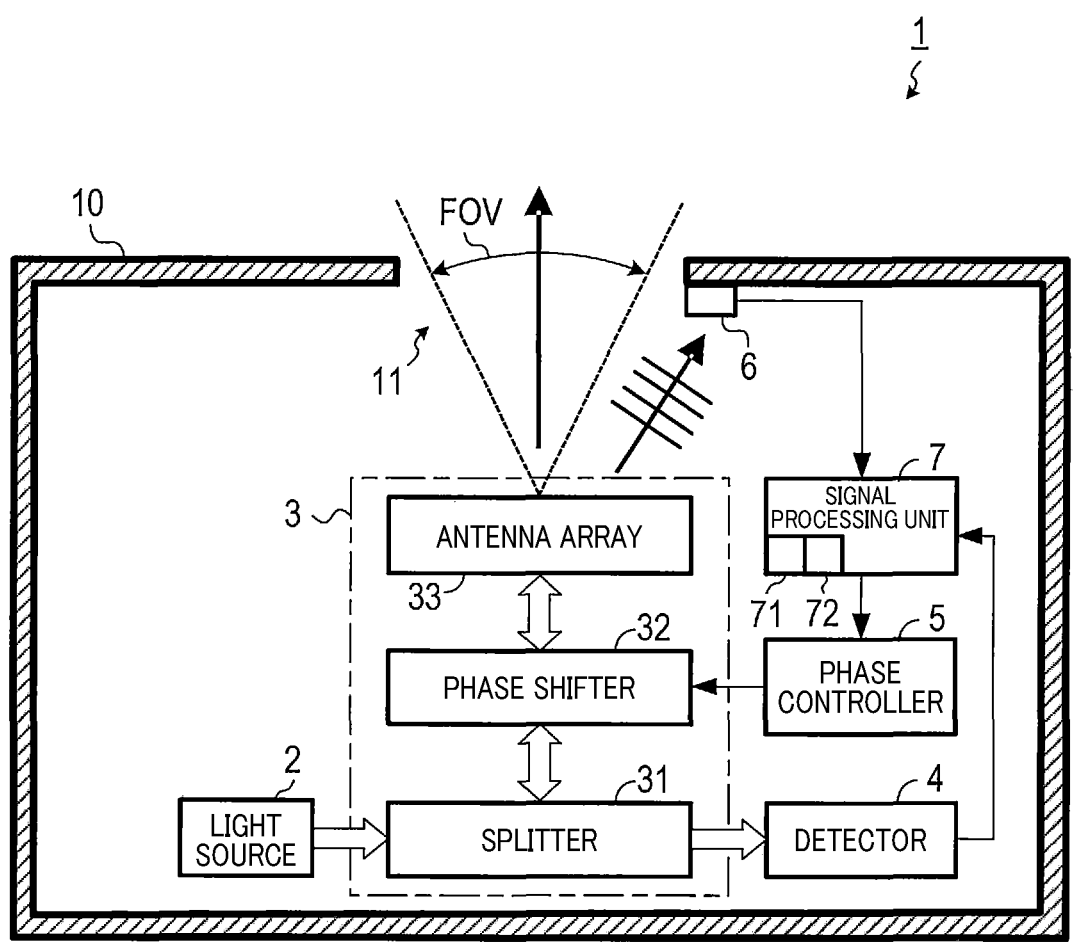
FIG. 1 is a block diagram illustrating a configuration of an optical scanner according to a first embodiment.

In the optical phased array, the phase shift amounts that are provided to the antenna elements for beam steering are theoretically uniquely prescribed based on an arrangement of the antenna array and a wavelength of the light that is used. However, when characteristics of waveguides from a light source to the antenna elements change as a result of temperature changes and the like, errors occur in the phase shift amounts that are provided to the antenna elements. Required performance regarding a beam profile, an emission angle, and the like cannot be obtained.

US 2020/0158839 A1 proposes a technology in which a phase monitor that monitors a phase of light that is supplied to each individual antenna element is set. Feedback control of the phase of the light that passes through a waveguide that is connected to each antenna element is performed such that a monitor value coincides with a target value.

However, as a result of keen examination by the inventors, an issue has been found in that, in the conventional technology, errors that are attributed to distortion of a substrate that affects three-dimensional arrangement of the antenna elements cannot be addressed.

That is, the optical phased array is formed on a substrate that is referred to as a PIC. PIC is an abbreviation of Photonic Integrated Circuit. When the optical phased array is applied to an onboard LiDAR, distortion (such as curving) is assumed to occur in the PIC substrate as a result of a surrounding temperature environment and heat generation from other mounted components. LiDAR is an abbreviation of Light Detection and Ranging. When distortion of the substrate occurs, as a result of the arrangement of the antenna elements changing in a three-dimensional manner, collapse of the beam profile and shifting of a beam emission angle occur. However, the conventional technology is a technology in which the three-dimensional arrangement of the antenna elements is presumed to be fixed. Therefore, the conventional technology cannot address errors that are attributed to distortion of the substrate that affects the three-dimensional arrangement of the antenna elements.

According to an aspect of the present disclosure, it is desired to provide a technology for correcting errors based on changes in an arrangement of antenna elements in an optical scanner that uses an optical phased array.

An exemplary embodiment of the present disclosure provides an optical scanner that includes a light source, an optical phase array, a monitoring light receiving unit, and a signal processing unit. The optical phased array is configured to implement scanning by a light beam by individually controlling phases of a plurality of branched lights into which light supplied from the light source is branched, using a scanning phase amount, and radiating light from an antenna array that has a plurality of antenna elements. The monitoring light receiving unit is configured to receive light radiated from the optical phased array. The signal processing unit is configured to detect characteristics of the light beam from a detection result of the monitoring light receiving unit and generate a phase adjustment amount for correcting the scanning phase amount such that a detection value of the characteristics coincides with a design value prepared in advance.

According to this configuration, a light beam that is radiated into space from the optical phased array is directly detected. Thus, a phase of light that is propagated through space can be directly fed back to generation of the phase adjustment amount. Therefore, compensation for errors can be made so as to include not only errors that are attributed to factors within a circuit that configures the optical phased array, but also errors that are attributed to factors outside the circuit that occur as a result of distortion of a substrate on which the optical phased array is mounted and the like. Consequently, optimization of a beam profile of the light beam and optimization of scanning by the light beam can be accurately implemented.

Embodiments of the present disclosure will hereinafter be described with reference to the drawings.

1. First Embodiment

[1-1. Configuration]

An optical scanner 1 shown in FIG. 1 includes a light source 2, an optical phased array (hereinafter referred to as an OPA) 3, a detector 4, a phase controller 5, a monitoring light receiving unit 6, and a signal processing unit 7.

The optical scanner 1 is housed in a housing 10 and irradiates light from an opening portion 11 that is formed in a front wall of the housing 10. The opening portion 11 is of a size that does not obstruct an FOV that is an angular range (that is, a scanning range) over which scanning is performed by a light beam that is irradiated from the OPA 3. FOV is an abbreviation of Field Of View.

The light source 2 is a device that generates laser light. Here, a frequency modulation (FM)-modulated continuous wave that has a 1.5-µm-band or a 1.3-µm-band wavelength is used.

The OPA 3 is a device that controls a cross-sectional shape (that is, a beam profile) and an advancing direction of a light beam using diffraction and interference of light. The OPA 3 includes a splitter 31, a phase shifter 32, and an antenna array 33. The OPA 3 is mounted on a single PIC substrate together with the light source 2.

The splitter 31 distributes incident light from the light source 2 to a waveguide array that is configured by a plurality of waveguides. In addition, the splitter 31 generates mixed light in which incident light from the waveguide array is mixed. The mixed light enters the detector 4 together with the incident light from the light source 2.

The phase shifter 32 is provided in each of the plurality of waveguides that configure the waveguide array. The phase shifters 32 individually change a phase of light that passes through the waveguide by changing a refractive index of the waveguide using an electro-optic effect, a thermo-optic effect, and the like, based on an instruction from the phase controller 5.

The antenna array 33 has K (for example, K=about several hundred or several thousand) antenna elements (hereafter, elements) that are arranged at regular intervals. In the waveguide array, end portions on a side opposite a connection end to the splitter 31 may be used as individual elements.

The antenna array 33 irradiates light that is supplied from the waveguide array towards the FOV. The antenna array 33 also receives light that arrives from the FOV and supplies the received light to the waveguide array. Here, the antenna array 33 may be configured to perform irradiation and reception of light through a diffraction grating that enables diffraction and interference of light.

Figure 2:
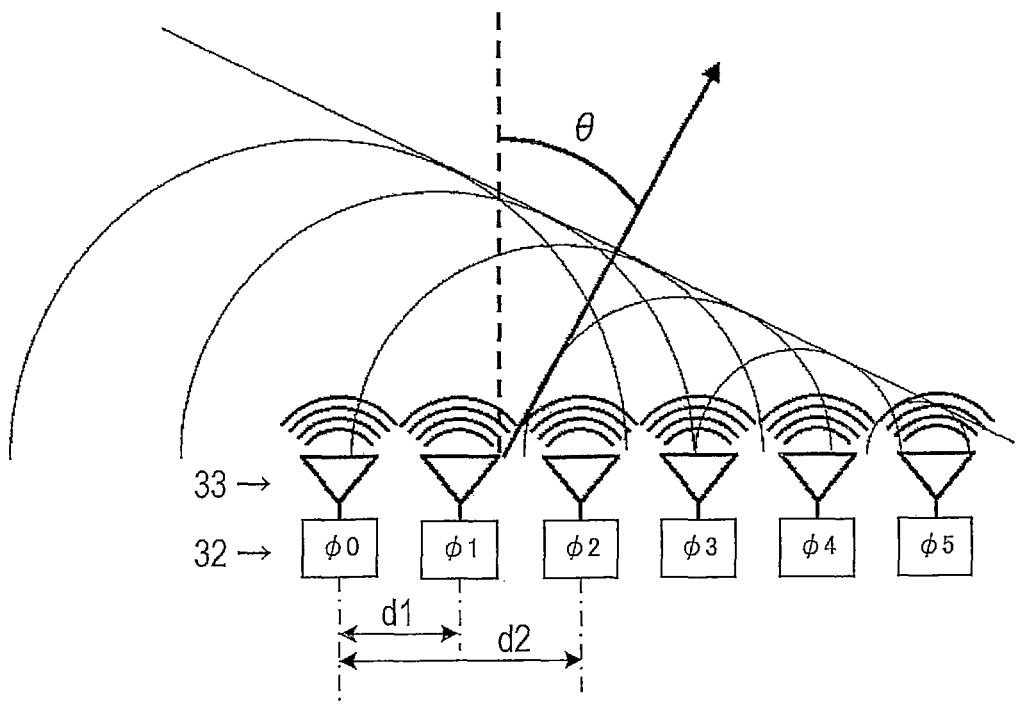
FIG. 2 is an explanatory diagram illustrating a principle of an optical phased array.

As shown in FIG. 2, in the OPA 3, an electric field Ek in a direction θ as a result of radiation from an element that is identified by an identifier k is expressed by expression (1). Here, E0 is an electrical field amplitude and EF(θ) is an element factor that indicates a directivity (that is, an irradiation pattern) of an individual element. λ is a wavelength, θ is a radio wavefront propagation/arrival direction, dk is a distance of the element identified by k from a reference element, and φk is a phase that is provided to the element identified by k from the phase shifter 32. Here, the reference element is an element that is positioned in one end (such as a left end in FIG. 2) of the antenna array 33 and is expressed by k=0. Hereafter, a value of k increases in order from that closest to the reference element.

$$E_k(\theta) = E_0 * EF(\theta)\exp\left(-i\frac{2\pi}{\lambda}d_k\sin\theta\right) \quad (1)$$

A composite electric field Esum(θ) that is generated by the overall antenna array 33 that has the K elements is expressed by expression (2). Here, AF(θ,λ) is an array factor that indicates a directivity of the overall antenna array 33 and is expressed by expression (3).

$$E_{sum}(\theta) = E_0 * AF(\theta, \lambda) \quad (2)$$

$$AF(\theta, \lambda) = EF(\theta)\sum_{k=0}^{K-1}\exp\left\{i\left(-\frac{2\pi}{\lambda}d_k\sin\theta + \phi_k\right)\right\} \quad (3)$$

Expression (4) is a phase conditional expression that is extracted from expression (3). A main lobe is formed in a direction θ0 that satisfies the phase conditional expression. That is, as a result of a phase φk being set to an appropriate value, the direction θ0 in which the main lobe is formed can be arbitrarily set. However, when m is an integer other than 0 and expression (5) is satisfied, a strong peak, that is, a grating lobe is also formed at an orientation θgm.

$$-\frac{2\pi}{\lambda}d_k\sin\theta_0 + \phi_k = 0 \quad (4)$$

$$-\frac{2\pi}{\lambda}d_k\sin\theta_{gm} + \phi_k = 2m\pi \quad (5)$$

Figure 3:
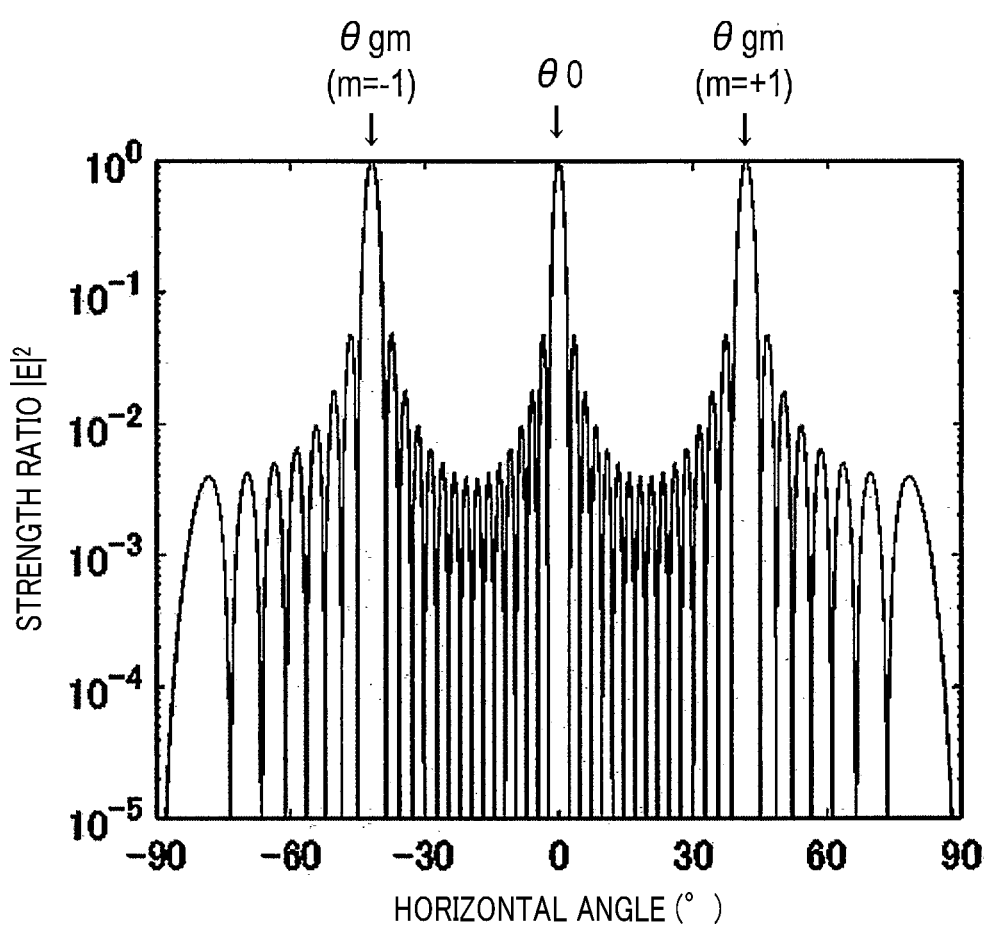
FIG. 3 is a graph illustrating an irradiation pattern of the optical phased array.

Therefore, in the OPA 3, an irradiation pattern such as that shown in FIG. 3 is obtained. The FOV is typically set within a range that is centered around the direction θ0 in which the main lobe is formed and does not include the direction θgm in which a grating lobe of which m=±1 is formed. However, the FOV may be widened using the grating lobe in some cases and is therefore not limited to the above-described range.

The detector 4 is configured using a light receiving element such as a photodiode. The detector 4 converts light that is generated by being received and mixed in the OPA 3 to an electrical signal, and supplies the electrical signal to the signal processing unit 7 as a light reception signal. The light reception signal is a beat signal that has a frequency component that is a difference between a transmission wave (that is, a reference wave) that is an FMCW wave and a reception wave.

The phase controller 5 implements scanning by a light beam by changing a scanning phase amount $\varphi(\theta)$ that is provided to the phase shifter 32 based on an irradiation direction $\theta$ of the light beam from the OPA 3. The scanning phase amount $\varphi(\theta)$ is a vector of which an element is phase shift amounts $\varphi 1$ to $\varphi K$ that are set for each element of the antenna array 33. The scanning phase amount $\varphi(\theta)$ is a value that is theoretically prescribed based on an arrangement of the elements and the irradiation direction $\theta$ of the beam.

The phase controller 5 provides, to the phase shifter 32, a value that is the scanning phase amount $\varphi(\theta)$ corrected by a phase adjustment amount $\psi$ supplied from the signal processing unit 7. The phase adjustment amount $\psi$ is a vector of which an element is adjustment amounts $\psi 1$ to $\psi K$ that are set for each element. The phase adjustment amount $\psi$ is an adjustment amount for removing an error in the phase that occurs as a result of the arrangement of the antenna array 33 being three-dimensionally changed by distortion of the substrate on which the OPA 3 is mounted and the like.

As shown in FIG. 1, the monitoring light receiving unit 6 is arranged within a range of the beam irradiation direction that is controllable by the OPA 3 and outside the FOV. Specifically, in the housing 10, the monitoring light receiving unit 6 is set on an inner wall surface of the front wall in which the opening portion 11 is formed or the like. For example, as the monitoring light receiving unit 6, a photo-diode (hereafter, PD) array in which a plurality of PDs are one-dimensionally or two-dimensionally arrayed may be used.

The signal processing unit 7 includes a microcomputer that has a central processing unit (CPU) 71 and a semiconductor memory (hereafter, memory) 72 such as a read-only memory (ROM) or a random access memory (RAM). The signal processing unit 7 performs at least an ordinary process and a correction process. In addition to a program for performing the ordinary process and the correction process, the memory 72 stores therein at least a design value of the beam profile that is used in the correction process and a look-up table (hereafter, LUT).

[1-2. Beam Profile]

The beam profile is information that indicates characteristics of the light beam that is formed by the OPA 3. The beam profile may include at least one of a divergence angle of the beam and a deviation amount of the beam irradiation direction. In the beam profile, an error E occurs in relation to an original design value as a result of the PIC substrate on which the OPA 3 is mounted becoming distorted due to heat and the like. The error E has differing tendencies depending on a distortion amount and a distortion direction.

Figure 4:
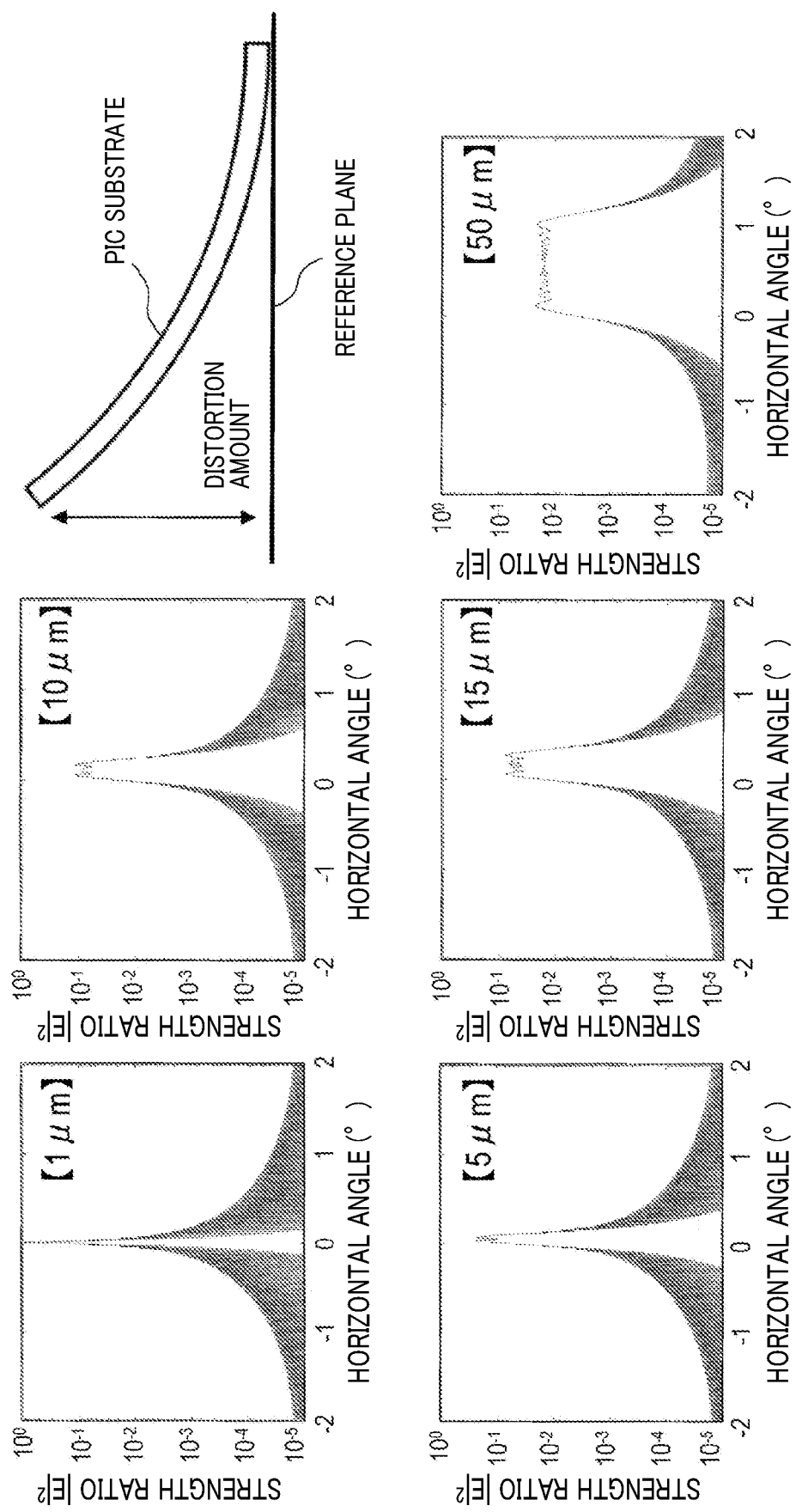
FIG. 4 is an explanatory diagram illustrating effects on a beam profile due to distortion of a substrate.

Specifically, as shown in FIG. 4, as the distortion amount increases, the divergence angle of the beam tends to increase. In addition, the deviation amount of the beam irradiation direction (that is, a center direction of the main lobe) also tends to increase.

Figure 5:
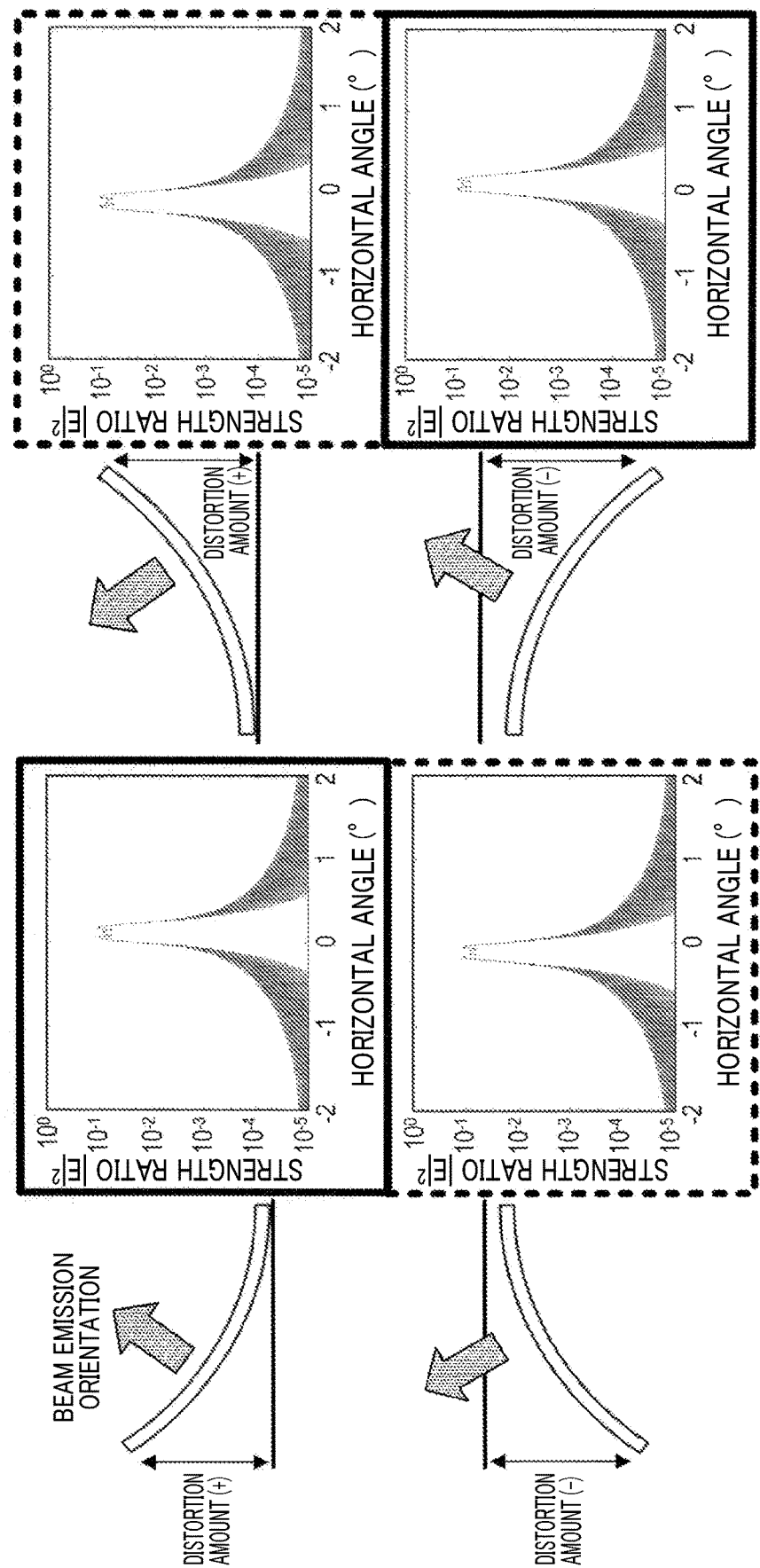
FIG. 5 is an explanatory diagram illustrating a relationship between a manner of distortion of the substrate and the beam profile.

Furthermore, as shown in FIG. 5, in a case in which a left end of the PIC substrate is distorted in a positive direction from a reference plane that corresponds to the design value and a case in which a right end of the PIC substrate is distorted in a negative direction from the reference plane, the irradiation direction shifts in a rightward direction in both cases. In a case in which the right end of the PIC substrate is distorted in the positive direction from the reference plane and a case in which the left end of the PIC substrate is distorted in the negative direction from the reference plane, the irradiation direction shifts in a leftward direction in both cases.

The LUT is generated using the tendencies of the error E in the beam profile. Specifically, the LUT has content in which the error E and a correction amount $\Delta\psi$ that is used in an update of the phase adjustment amount $\psi$ are associated. In addition, as the LUT, LUTs that have four differing combinations of the direction in which the irradiation direction is shifted (that is, the rightward direction or the leftward direction) and a manner of distortion (that is, the positive direction or the negative direction) are provided.

[1-3. Processes]

Figure 6:
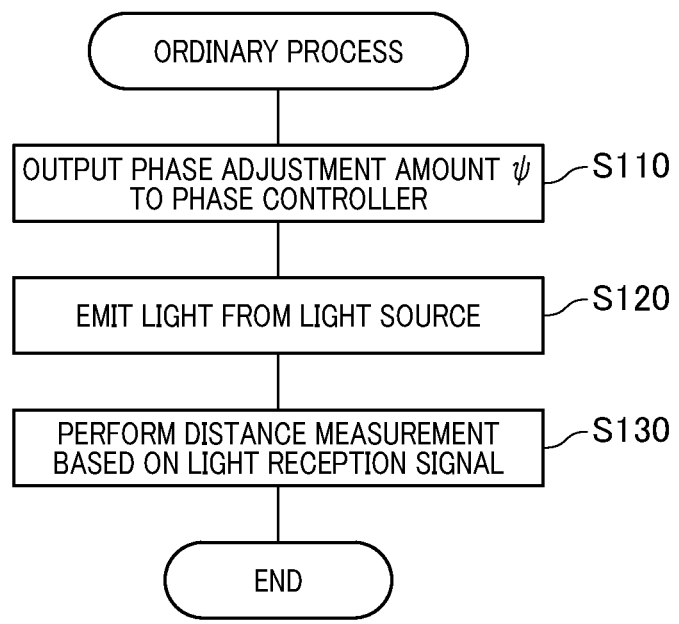
FIG. 6 is a flowchart illustrating an ordinary process according to the first embodiment.

The ordinary process performed by the signal processing unit 7 will be described with reference to a flowchart in FIG. 6.

The ordinary process is repeatedly performed at an ordinary process cycle that is set in advance.

At S110, the signal processing unit 7 outputs the phase adjustment amount $\varphi$ to the phase controller 5. A value that has been last updated in the correction process is used as the phase adjustment amount $\psi$. However, when an allowable time that is set in advance or more has elapsed since a most recent correction process was performed, the phase adjustment amount $\psi$ may be set to 0.

At subsequent S120, the signal processing unit 7 makes the light source 2 emit light for an amount of time that is required for scanning of the FOV.

At this time, the phase controller 5 supplies a phase shift amount $\psi(\theta)+\psi$ in which the phase adjustment amount $\psi$ is added to the scanning phase amount $\psi(\theta)$ to the phase shifter 32 while successively changing the scanning phase amount $\psi(\theta)$. As a result, the light beam that scans the FOV is irradiated from the OPA 3.

At subsequent S130, the signal processing unit 7 acquires the light reception signal from the detector 4 and performs a distance measurement process using a known means of an FMCW radar based on the light reception signal. The signal processing unit 7 then ends the process.

Figure 7:
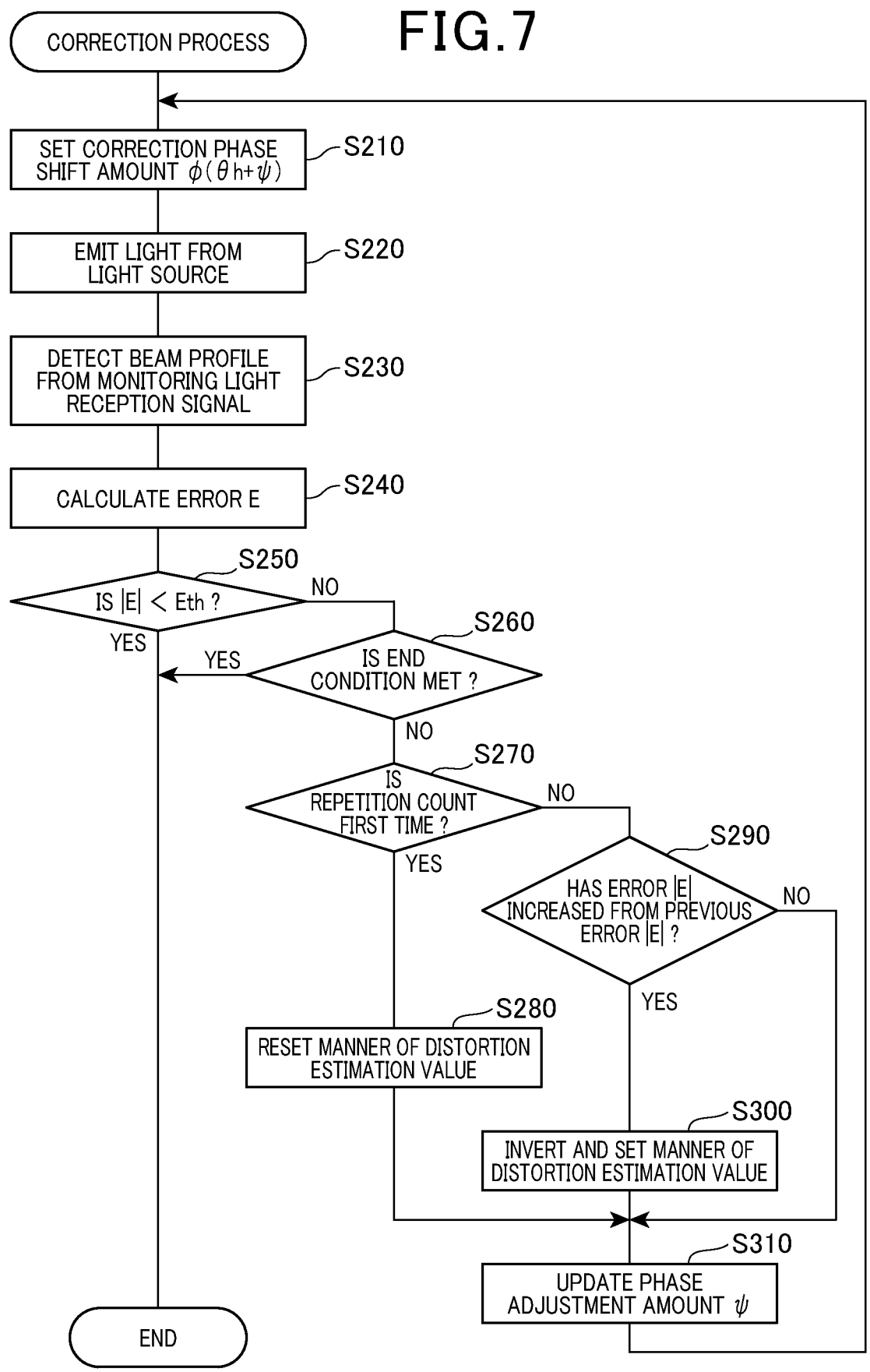
FIG. 7 is a flowchart illustrating a correction process according to the first embodiment.

Next, the correction process performed by the signal processing unit 7 will be described with reference to a flowchart in FIG. 7.

The correction process is performed before or after the ordinary process every time the ordinary process is performed. The correction process may be performed at every correction process cycle that is set to be longer than the ordinary process cycle, or every time the optical scanner 1 is started.

At S210, the signal processing unit 7 outputs an instruction to the phase controller 5 such that the phase shift amount $\varphi(\theta h+\psi)$ for correction is supplied to the phase shifter 32. $\theta h$ is an orientation angle at which the monitoring light receiving unit 6 is positioned when viewed from a radial center of the OPA 3 and is a fixed value that is determined by a structure of the optical scanner 1. $\psi$ is a phase adjustment amount that is currently set.

At subsequent S220, the signal processing unit 7 makes the light source 2 emit light. When the light source 2 emits light, a light beam is irradiated from the OPA 3 towards the monitoring light receiving unit 6.

At subsequent S230, the signal processing unit 7 acquires a monitoring light reception signal from the monitoring light receiving unit 6 and detects the beam profile of the light beam that is irradiated from the OPA 3 based on the acquired monitoring light reception signal. Specifically, the signal processing unit 7 detects the divergence angle of the beam and the deviation amount of the beam irradiation direction.

At subsequent S240, the signal processing unit 7 calculates the error E in the detection value in relation to the design value of the beam profile at S230. The error E expresses a magnitude of shifting by an absolute value and a direction of the shifting by a positive/negative sign. Therefore, the error E may be calculated using the shifting amount of the irradiation direction as is as the detection value. Alternatively, the error E may be calculated using a value in which a sign (that is, the shifting direction) of the deviation amount of the beam irradiation direction is combined with the divergence angle of the beam as the detection value.

At subsequent S250, whether an absolute value |E| of the error E calculated at S240 is less than a threshold Eth that is set in advance is determined. When |E|<Eth, the process is ended. When |E|≥Eth, the process proceeds to S260.

At S260, the signal processing unit 7 determines whether an end condition is met. For example, as the end condition, whether a repetition count of the process has reached an upper limit value can be used. When the end condition is met, the signal processing unit 7 ends the process. When the end condition is not met, the signal processing unit 7 advances the processes to S270.

At S270, the signal processing unit 7 determines whether the repetition count of the processes at S210 to S250 in a current correction cycle is the first time. When the repetition count is the first time, the signal processing unit 7 advances the process to S280. When the repetition count is the second time or subsequent thereto, the signal processing unit 7 advances the process to S290.

At S280, the signal processing unit 7 resets a distortion setting value that indicates whether the manner of distortion of the PIC substrate that has caused the error E to occur is distortion towards the positive side or distortion towards the negative side, and advances the process to S310. In the resetting of the distortion setting value, the same value as the distortion setting value that has been finally set when a previous correction process was started is set. However, when an allowable time that is set in advance or more has elapsed from the previous correction process, either value may be set.

At S290, the signal processing unit 7 compares the error |E| calculated at S240 and the error |E| calculated at S240 in a previous repeated cycle, and determines whether the error |E| has increased. When the error |E| has increased, the signal processing unit 7 advances the process to S300. When the error |E| has not increased, the signal processing unit 7 advances the process to S310.

At S300, the signal processing unit 7 inverts (reverses) the distortion setting value and advances the process to S310.

At S310, the signal processing unit 7 determines the correction amount $\Delta\psi$ for bringing the error E calculated at S240 closer to zero using the LUT that corresponds to the distortion setting value. The signal processing unit 7 updates the phase adjustment amount $\psi$ by adding the determined correction value $\Delta\psi$ to the current value of the phase adjustment amount $\psi$, and returns the process to S210. Here, the update of the phase adjustment amount $\psi$ may be performed using a calculation formula or the like instead of using the LUT.

Here, a meaning of the processes at S270 to S310 is as follows. That is, as shown in FIG. 5, because a state in which the manner of distortion cannot be differentiated by only the error E in the beam profile is present, first, for example, the left end is presumed to be distorted in the positive direction and the phase adjustment amount $\psi$ is updated using the LUT that corresponds to this state. Then, if the error |E| decreases as a result of the processes at S210 to S250 being repeated, the presumption of the manner of distortion is estimated to be correct. Therefore, the update of the phase adjustment amount $\psi$ is repeated using the same LUT. If the error |E| increases as a result of the processes at S210 to S250 being repeated, the presumption of the manner of distortion is estimated to be incorrect. Therefore, the presumption of the manner of distortion is reversed, that is, the right end is presumed to be distorted in the negative direction, and the phase adjustment amount $\psi$ is updated using the LUT that corresponds to this state.

[1-3. Effects]

According to the first embodiment described in detail above, following effects are achieved.

(1a) In the optical scanner 1, as a result of the irradiated light from the OPA 3 being directly detected by the monitoring light receiving unit 6, the phase of the light propagating through space is directly fed back to the phase adjustment amount $\psi$ provided to the phase shifter 32 of the OPA 3. Therefore, compensation can be collectively made for not only errors that are attributed to factors within a circuit that is mounted on the PIC substrate that occur as a result of variations in characteristics between waveguides from the light source 2 to the antenna array 3 and the like, but also errors that are attributed to factors outside the circuit that occur as a result of distortion of the PIC substrate and the like. Consequently, optimization of the beam profile of the light beam and optimization of scanning by the light beam can be accurately implemented.

(1b) In the optical scanner 1, the LUTs that differ depending on the manner of distortion of the PIC substrate are prepared and the correction amount $\Delta\psi$ is calculated using the arbitrarily selected LUT. Furthermore, whether the appropriate LUT is selected, that is, whether an assumption regarding the manner of distortion is correct is determined based on increase/decrease in the error |E| after the phase adjustment amount $\psi$ is updated by the calculated correction amount $\Delta\psi$. Therefore, in the optical scanner 1, the manner of distortion of the PIC substrate that is difficult to identify by the beam profile that is detected from the monitoring light reception signal can be estimated. Consequently, the phase adjustment amount $\psi$ can be accurately updated.

2. Second Embodiment

[2-1. Differences from the First Embodiment]

A basic configuration according to a second embodiment is similar to that according to the first embodiment. Therefore, differences will be described below. Here, reference numbers that are same to those according to the first embodiment indicate identical configurations. Therefore, the foregoing descriptions are referenced.

According to the second embodiment, a calculation method for the phase adjustment amount $\psi$ differs from that according to the first embodiment.

Figure 8:
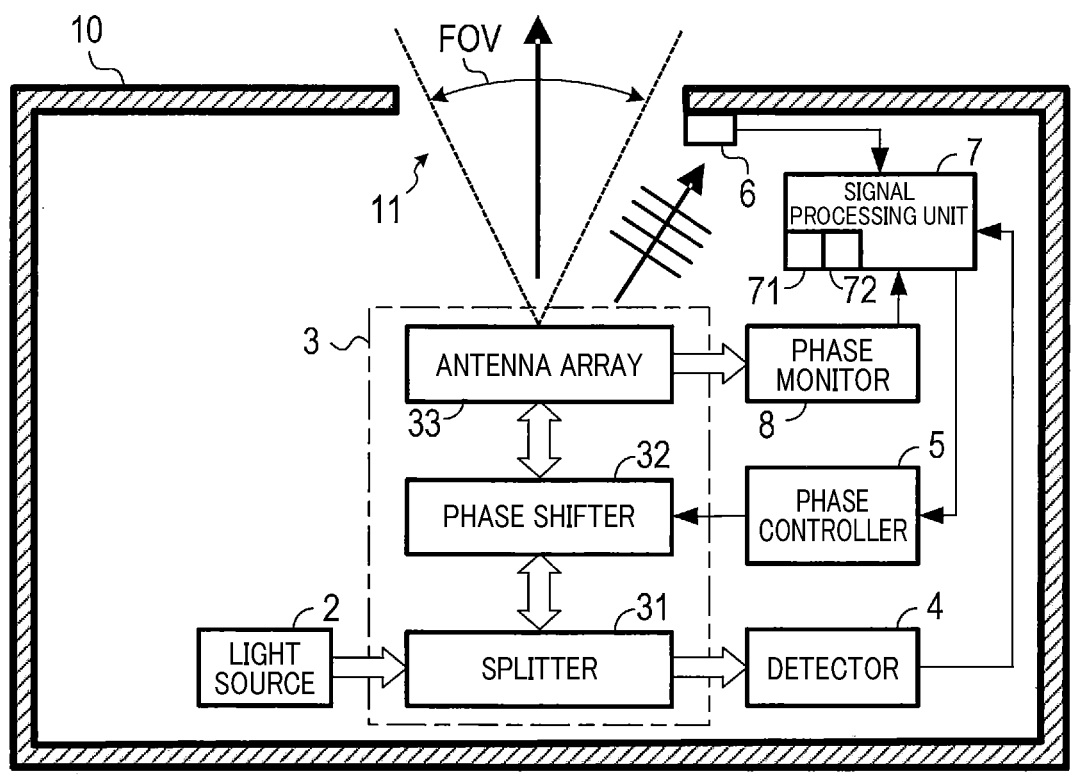
FIG. 8 is a block diagram illustrating a configuration of an optical scanner according to a second embodiment.

As shown in FIG. 8, an optical scanner 1a according to the present embodiment include a phase monitor 8 in addition to the configuration of the optical scanner 1 according to the first embodiment.

The phase monitor 8 individually detects the phase of the light that is supplied to each element forming the antenna array 33.

The signal processing unit 7 calculates the phase adjustment amount $\psi$ using a detection signal from the phase monitor 8 in addition to a detection signal from the monitoring light receiving unit 6.

[2-2. Processes]

Figure 9:
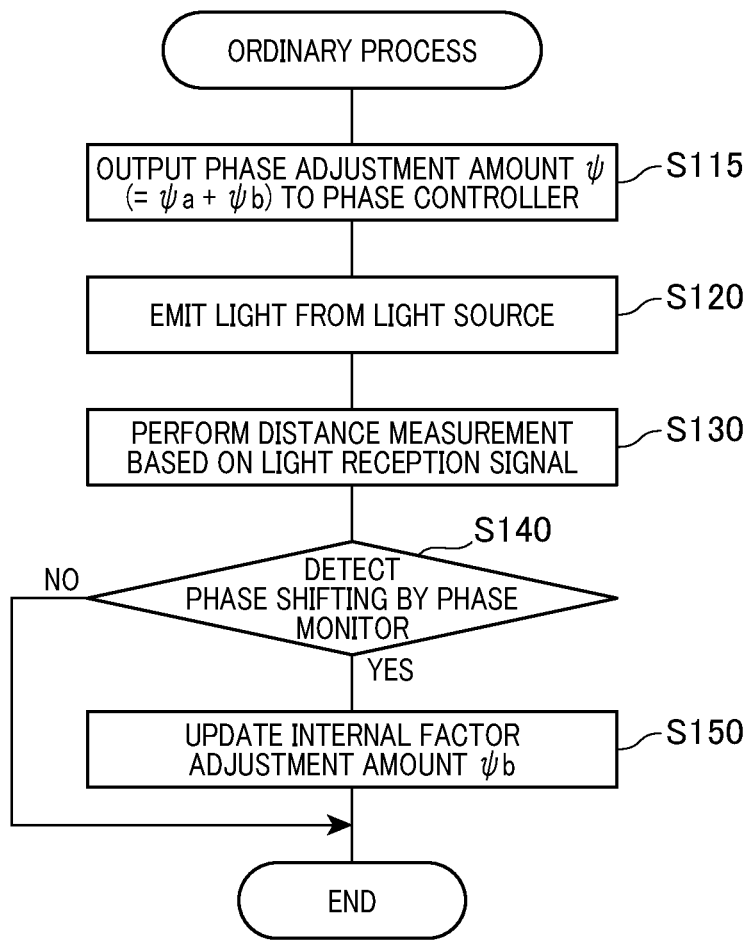
FIG. 9 is a flowchart illustrating an ordinary process according to the second embodiment.

An ordinary process performed by the signal processing unit 7 according to the second embodiment instead of the ordinary process shown in FIG. 6 will be described with reference to a flowchart in FIG. 9.

At S115, the signal processing unit 7 outputs, to the phase controller 5, a total value of an external factor adjustment amount ψa and an internal factor adjustment amount ψb as the phase adjustment amount ψ. As ψa and ψb, values that have been last updated by the ordinary process or the correction process are used. However, regarding the external factor adjustment amount ψa, when an allowable time that is set in advance or more has elapsed from when the last update was performed, the external factor adjustment amount ψa may be set to 0.

The processes at subsequent S120 to S130 are similar to those according to the first embodiment. Therefore, descriptions thereof are omitted.

At subsequent S140, the signal processing unit 7 acquires the detection signal from the phase monitor 8 and determines whether shifting (hereafter, phase shifting) from a design value is present in a phase difference in the supplied light between the elements based on the acquired detection signal. When determined that phase shifting is present, the signal processing unit 7 advances the process to S150. When determined that phase shifting is not present, the signal processing unit 7 ends the process.

At S150, the signal processing unit 7 calculates a correction amount Δψb for matching the phase difference in the supplied light between elements to the design value (that is, setting the phase shifting to 0). The signal processing unit 7 adds the correction amount Δψb to the current internal factor adjustment amount ψb and thereby updates the internal factor adjustment amount ψb. The signal processing unit 7 then ends the process.

Figure 10:
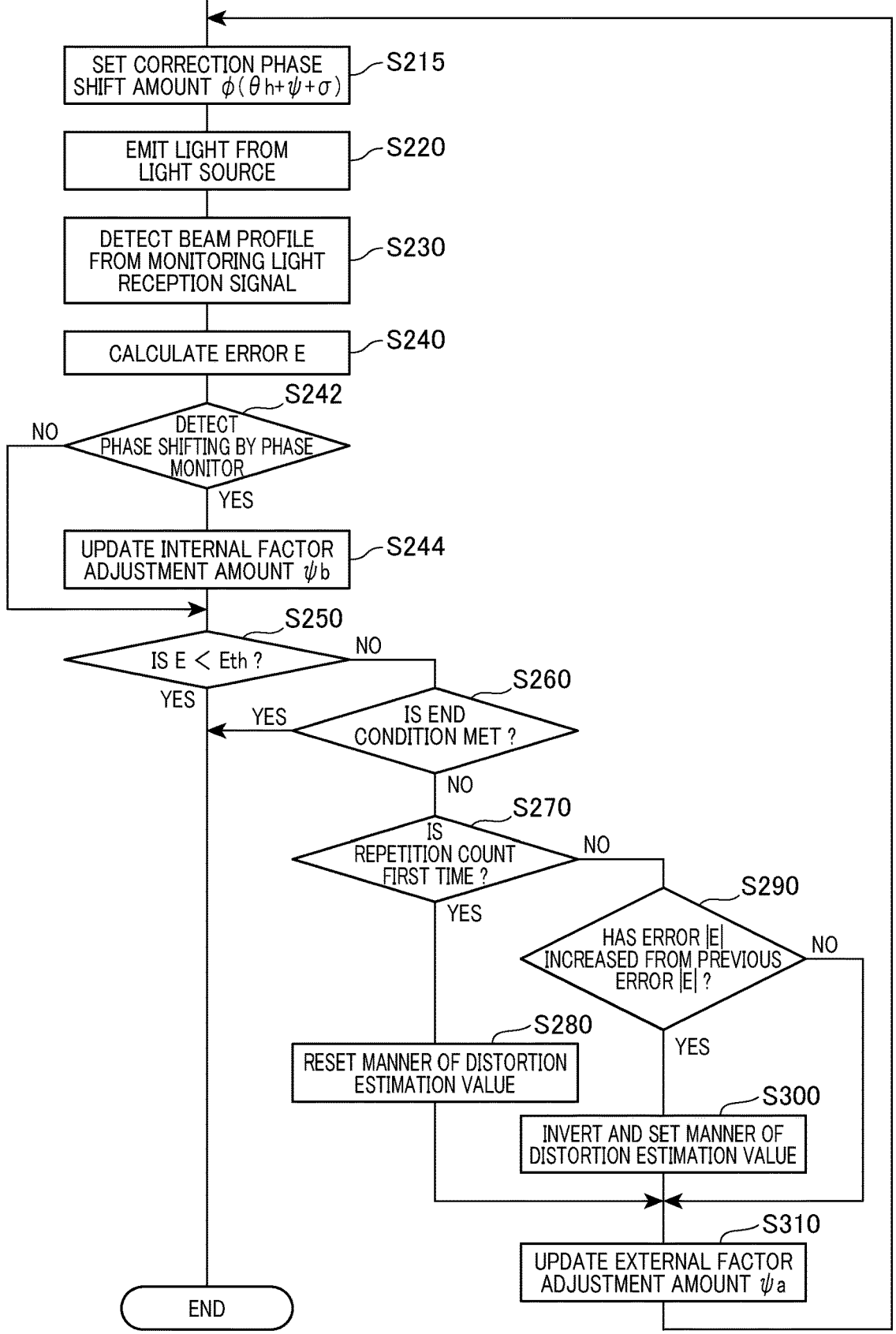
FIG. 10 is a flowchart illustrating a correction process according to the second embodiment.

Next, a correction process performed by the signal processing unit 7 according to the second embodiment instead of the correction process shown in FIG. 7 will be described with reference to a flowchart in FIG. 10.

At S215, the signal processing unit 7 outputs an instruction to the phase controller 5 such that a correction phase shift amount ψ(θh+ψ) is supplied to the phase shifter 32. θh is an orientation angle at which the monitoring light receiving unit 6 is positioned when viewed from the radial center of the OPA 3, and is a fixed value that is determined by the structure of the optical scanner 1a. ψ is a total value of the external factor adjustment amount ψa and the internal factor adjustment amount ψb.

The processes at subsequent S220 to S240 are similar to those according to the first embodiment. Therefore, descriptions thereof are omitted.

At subsequent S242, in a manner similar to the process at S140, the signal processing unit 7 acquires the detection signal from the phase monitor 8 and determines whether phase shifting is present based on the acquired detection signal. When determined that phase shifting is present, the signal processing unit 7 advances the process to S244. When determined that phase shifting is not present, the signal processing unit 7 advances the process to S250.

At S244, in a manner similar to the process at S150, the signal processing unit 7 calculates the correction amount Δψb and updates an internal factor adjustment amount ψb using the correction amount Δψb. The signal processing unit 7 then advances the process to S250.

The processes at S250 to S310 are similar to those according to the first embodiment. Therefore, descriptions are omitted. However, the phase adjustment amount ψ used in the descriptions of S250 to S310 should be read as an external factor adjustment amount ψa.

[2-3. Effects]

According to the second embodiment described in detail above, the effects (1a) and (1b) according to the first embodiment described above are achieved. In addition, following effects are achieved.

(2a) In the optical scanner 1a, the phase adjustment amount ψ is calculated so as to be separated into the external factor adjustment amount ψa and the internal factor adjustment amount ψb. Therefore, the phase adjustment amount ψ can be more accurately calculated. Control accuracy regarding the OPA 3 can be improved.

[3. Other Embodiments]

The embodiments of the present disclosure are described above. However, the present disclosure is not limited to the above-described embodiments. Various modifications are possible.

Figure 11:
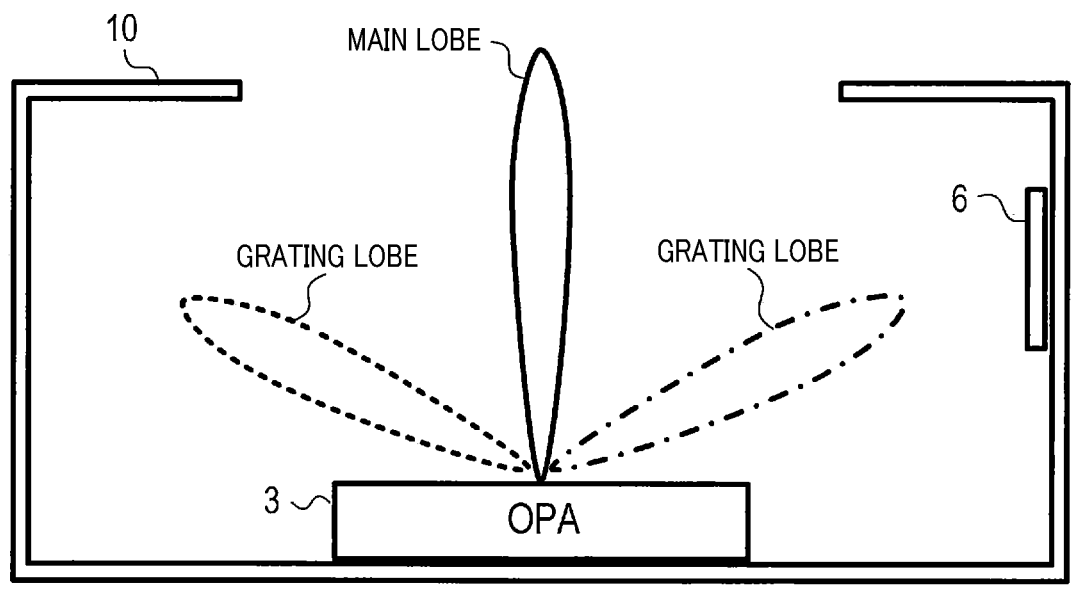
FIG. 11 is an explanatory diagram illustrating another arrangement method of a monitoring light receiving unit.

(3a) According to the above-described embodiments, the monitoring light receiving unit 6 is provided on the inner wall surface of the front wall in which the opening portion 11 is formed in the housing 10. However, as shown in FIG. 11, the monitoring light receiving unit 6 may be provided on the inner wall surface of a side wall of the housing 10.

(3b) According to the above-described embodiments, the monitoring light receiving unit 6 is arranged in a position to which the main lobe can be directed. However, the arrangement of the monitoring light receiving unit 6 is not limited to the position to which the main lobe can be directed. For example, as shown in FIG. 11, when the main lobe is in a predetermined direction (such as a front direction), the monitoring light receiving unit 6 may be arranged in a position in which the grating lobe is irradiated. In this case, beam control for the correction process can be made unnecessary.

Figure 12:
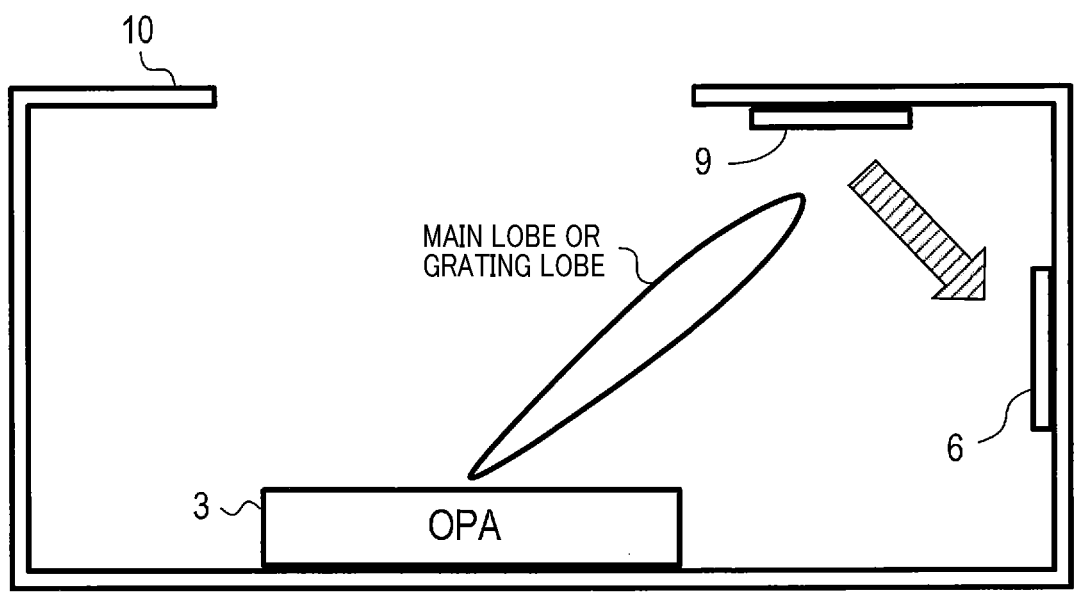
FIG. 12 is an explanatory diagram illustrating an arrangement example when the monitoring light receiving unit receives light via a mirror.
Figure 13:
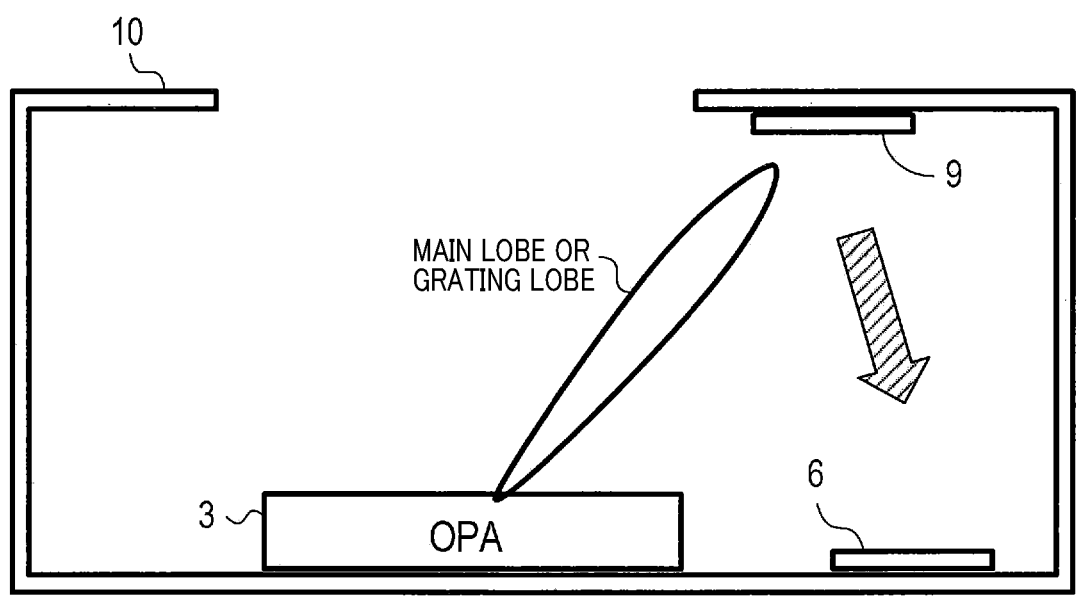
FIG. 13 is an explanatory diagram illustrating an arrangement example when the monitoring light receiving unit receives light via a mirror.

(3c) According to the above-described embodiments, the monitoring light receiving unit 6 is arranged in a position in which the irradiated light from the OPA 3 is directly received. However, a mirror 9 may be arranged in a position that is struck by the irradiated light from the OPA 3, and the monitoring light receiving unit 6 may be arranged in a position that receives reflected light reflected by the mirror 9. In this case, as shown in FIG. 12, the monitoring light receiving unit 6 may be arranged on the side wall of the housing 10 or, as shown in FIG. 13, arranged on the same wall surface on which the OPA 3 and the like are arranged. As a result of the mirror 9 being provided, a degree of freedom in the arrangement of the monitoring light receiving unit 6 can be improved.

(3d) The signal processing unit 7 and a method thereof described in the present disclosure may be implemented by a dedicated computer that is provided so as to be configured by a processor and a memory, the processor being programmed to provide a single or a plurality of functions that are realized by a computer program. Alternatively, the signal processing unit 7 and a method thereof described in the present disclosure may be implemented by a dedicated computer that is provided by a processor being configured by a single or a plurality of dedicated hardware logic circuits. Alternatively, the signal processing unit 7 and a method thereof described in the present disclosure may be implemented by one or more dedicated computers that are configured by a combination of a processor that is programmed to provide a single or a plurality of functions, a memory, and a processor that is configured by one or more hardware logic circuits. In addition, the computer program may be stored in a non-transitory computer-readable (tangible) recording medium that can be read by a computer as instructions performed by the computer. A method for implementing functions of sections included in the signal processing unit 7 is not necessarily required to include software. All of the functions may be implemented through use of a single or a plurality of pieces of hardware.

(3e) A plurality of functions provided by a single constituent element according to the above-described embodiments may be implemented by a plurality of constituent elements. A single function provided by a single constituent element may be implemented by a plurality of constituent elements. In addition, a plurality of functions provided by a plurality of constituent elements may be implemented by a single constituent element. A single function provided by a plurality of constituent elements may be implemented by a single constituent element. Furthermore, a part of a configuration according to the above-described embodiment may be omitted. Moreover, at least a part of a configuration according to an above-described embodiment may be added to or replace a configuration according to another of the above-described embodiments.

(3f) The present disclosure can also be implemented by various modes in addition to the above-described optical scanner, such as a system in which the optical scanner is a constituent element, a program for enabling a computer to function as the optical scanner, a non-transitory computer-readable (tangible) recording medium such as a semiconductor memory that records the program therein, and a phase adjustment method for an OPA.

What is claimed is:

1. An optical scanner comprising:
   a light source;
   an optical phased array that is configured to implement scanning by a light beam by individually controlling phases of a plurality of branched lights into which light supplied from the light source is branched, using a scanning phase amount, and radiating light from an antenna array that has a plurality of antenna elements;
   a monitoring light receiving unit that is configured to receive light radiated from the optical phased array; and
   a signal processing unit that is configured to detect characteristics of the light beam from a detection result of the monitoring light receiving unit and generate a phase adjustment amount for correcting the scanning phase amount such that a detection value of the characteristics coincides with a design value prepared in advance.

2. The optical scanner according to claim 1, wherein:
   the signal processing unit uses at least one of a divergence angle of a beam and a deviation amount of a beam irradiation direction as the characteristics of the light beam.

3. The optical scanner according to claim 2, wherein:
   the monitoring light receiving unit is arranged in a position that receives a grating lobe that is formed by the optical phased array.

4. The optical scanner according to claim 3, wherein:
   the monitoring light receiving unit is arranged outside a scanning range of the optical phased array.

5. The optical scanner according to claim 4, further comprising:
   a phase monitor that is configured to individually detect phases of the plurality of branched lights, wherein
   the signal processing unit is configured to set, as the phase adjustment amount, a result obtained by adding an external factor adjustment amount to an internal factor adjustment amount, the external factor adjustment amount being calculated from the detection result of the monitoring light receiving unit, and being caused by distortion of a surface on which the antenna elements are arranged, and the internal factor adjustment amount being calculated from a detection result of the phase monitor, and being caused by variations in characteristics between waveguides that respectively propagate the plurality of branched lights.

6. The optical scanner according to claim 5, wherein:
   the signal processing unit is configured to calculate a correction amount that is used for update of the phase adjustment amount using a look-up table prepared in advance, from an error in the detection value in relation to the design value related to the characteristics of the light beam.

7. The optical scanner according to claim 6, wherein:
   the light source and the optical phased array are mounted on a same substrate.

8. The optical scanner according to claim 1, wherein:
   the monitoring light receiving unit is arranged in a position that receives a grating lobe that is formed by the optical phased array.

9. The optical scanner according to claim 1, wherein:
   the monitoring light receiving unit is arranged outside a scanning range of the optical phased array.

10. The optical scanner according to claim 1, further comprising:
    a phase monitor that is configured to individually detect phases of the plurality of branched lights, wherein
    the signal processing unit is configured to set, as the phase adjustment amount, a result obtained by adding an external factor adjustment amount to an internal factor adjustment amount, the external factor adjustment amount being calculated from the detection result of the monitoring light receiving unit, and being caused by distortion of a surface on which the antenna elements are arranged, and the internal factor adjustment amount being calculated from a detection result of the phase monitor, and being caused by variations in characteristics between waveguides that respectively propagate the plurality of branched lights.

11. The optical scanner according to claim 1, wherein:
    the signal processing unit is configured to calculate a correction amount that is used for update of the phase adjustment amount using a look-up table prepared in advance, from an error in the detection value in relation to the design value related to the characteristics of the light beam.

12. The optical scanner according to claim 1, wherein:
    the light source and the optical phased array are mounted on a same substrate.

* * * * *